Oct. 31, 1933.　　　C. J. HANSEN　　　1,932,820
REMOVAL OF HYDROGEN SULPHIDE AND AMMONIA FROM GASES
Original Filed Aug. 20, 1928
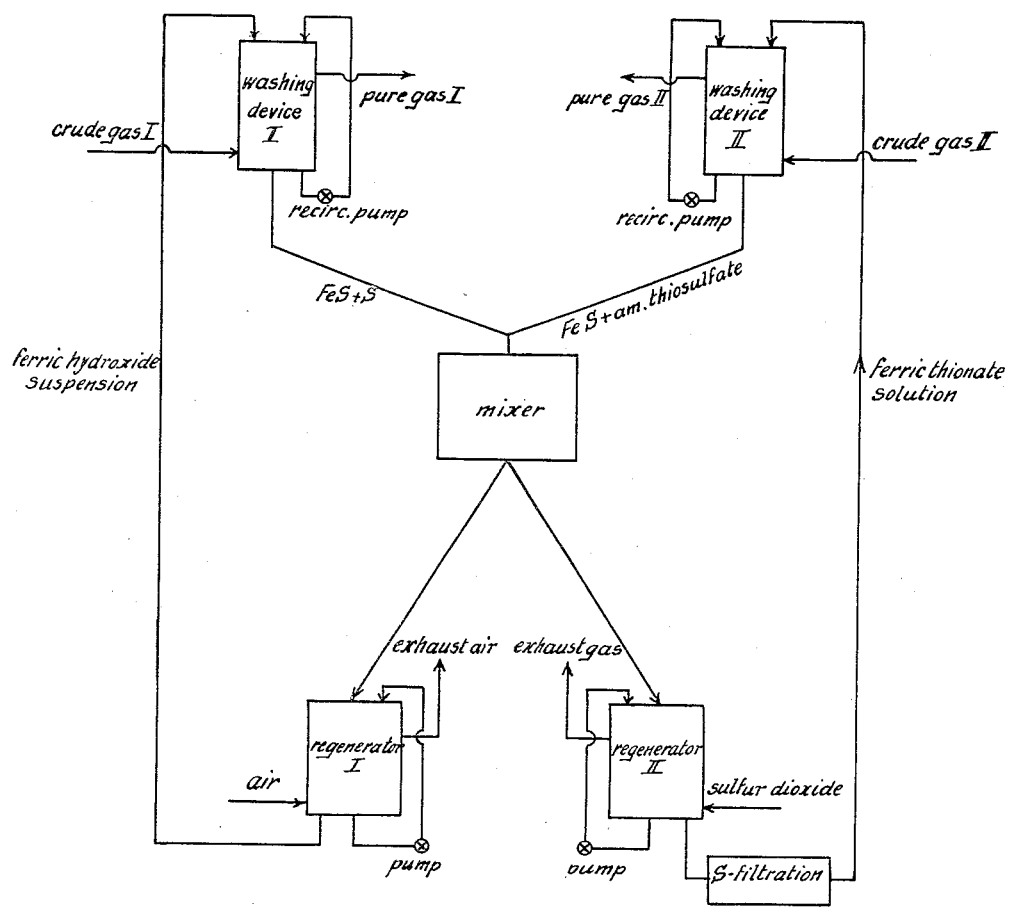
Inventor:
Christian J. Hansen
by Karlinshain
Atty.

Patented Oct. 31, 1933

1,932,820

UNITED STATES PATENT OFFICE 1,932,820

REMOVAL OF HYDROGEN SULPHIDE AND AMMONIA FROM GASES

Christian J. Hansen, Essen-on-the-Ruhr, Germany, assignor, by mesne assignments, to The Koppers Company of Delaware, Pittsburgh, Pa., a corporation of Delaware Original application August 20, 1928, Serial No. 300,945, and in Germany October 22, 1927. Divided and this application December 4, 1929. Serial No. 411,686

3 Claims. (Cl. 23—225)

My invention refers to the treatment of gases, more especially gases such as result in the distillation of coal and other carbonaceous material. It is a particular object of my invention to provide means whereby the ammonia and sulphur which are contained in such gases, the latter mostly under the form of hydrogen sulphide, can be recovered from the gases in an easier and more perfect manner than was hitherto possible.

It is known to recover the ammonia and hydrogen sulphide from gases by means of solutions of thionates of iron, zinc or manganese. In this process there results metal sulphide and a solution of ammonium thionate and in some cases also free sulphur. This reaction, which may be expressed by the equation

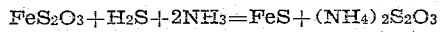

$$FeS_2O_3 + H_2S + 2NH_3 = FeS + (NH_4)_2S_2O_3$$

requires the presence of $2NH_3$ per $1H_2S$, the excess of hydrogen sulphide present remaining substantially unabsorbed. This method is applicable merely in those hardly existing cases where the ammonia is present in the coal distillation gases in an amount at least equivalent to the hydrogen sulphide contents.

The metal sulphide, which may be ferric sulphide, manganese sulphide or zinc sulphide is redissolved by acting thereon with sulphur dioxide and there results a metal thionate solution and free sulphur. This solution has hitherto been treated further in such manner that the solution containing, besides sulphur, metal and ammonium thionates in solution was decomposed by heating into sulphate and sulphur, and the metal (iron, manganese or zinc) was removed by treating the sulphate solution with fresh gas before starting the gas purification process proper.

The process above described involves the great disadvantage that in the case where iron is present, iron disulphide ($FeS_2$) is obtained, which is not soluble in sulphur dioxide and other acids.

The metal thionate solutions described are further able only to take up ammonia and hydrogen sulphide in the predetermined proportion of $2NH_3:1H_2S$. Now in view of the fact that the gases resulting for instance in the distillation of coal always contain more hydrogen sulphide (gas resulting in the distillation of Ruhr coal about 50 per cent, English coal partly 100 to 200 per cent more than corresponds to the above proportion), a process of purification as above described always leaves a more or less considerable proportion of hydrogen sulphide in the gas.

It is further known to remove hydrogen sulphide from gases free from ammonia by different means such as 1. Solutions of polythionates,
2. Solutions of thiosulphates, to which sulphur dioxide is added,
3. Suspensions of ferric hydroxide.

The means recited above for recovering the hydrogen sulphide differ as regards their velocity of reaction.

The slowest acting is the solution of polythionates while a thiosulphate solution, to which sulphur dioxide is added, will act somewhat more quickly. However the velocity of reaction of these solutions is always so small that in the case of a polythionate solution and a gas containing for instance 0.8 per cent $H_2S$, only 33 per cent of the hydrogen sulphide can be removed, with a solution of thiosulphate and sulphur dioxide only about 50% per unit of time.

On the other hand a suspension of ferric hydroxide will act on a gas washing liquor having neutral or slightly alkaline reaction so favorably that the total removal of hydrogen sulphide can be effected under commercial conditions.

Unfortunately the use of suspensions of ferric hydroxide involves the great disadvantage, that when the spent washing liquor is regenerated with air or another gas containing oxygen, there results a mixture of ferric hydroxide and sulphur and the separation of the sulphur from the iron sludge is very expensive. One is further forced to keep the percentage of iron in such solutions as low as possible in order to obtain the most favorable proportion between the sulphur and the iron. This entails the drawback, that the absorbing capacity of such washing liquor for hydrogen sulphide is comparatively small.

With an iron content of about 2 kgs. per cubic-meter of the solution, not more than 100 cubic-meters of gas can be treated at the utmost.

In my copending application for patent of the United States, Serial No. 300,945, (now Patent 1,840,579) I have described a method for treating coke oven gases for the recovery of useful admixtures, which method allows obviating the above described drawbacks inherent in both absorption modes by carrying them out in sequence. It consists in treating the gas with a suspension of iron or manganese hydroxide in order to remove part of the hydrogen sulphide, whereupon the gas is treated with a solution of iron or manganese thionate, by which the residual hydrogen sulphide and ammonia are absorbed.

This combined method allows removing from a gas besides the ammonia contents, all the hydrogen sulphide irrespective of the proportion of these two admixtures, and more particularly from a gas which contains less than $2NH_3$ per $1H_2S$.

On the other hand all the elementary sulphur obtained thereby can readily be recovered in a pure state, free of ferric or manganese hydroxide, by mixing the two different washing liquors when spent, dividing the mixture into two parts and separately regenerating each part by treating it with air or sulphur dioxide, respectively. While the suspension of free sulphur and ferric or manganese hydroxide obtained by the treatment with air can immediately be reused, the liquor obtained by the introduction of sulphur dioxide, which contains iron or manganese thionates in solution and merely elementary sulphur in suspension, is first filtered, whereby the sulphur is obtained in a pure state, free of ferric or manganese hydroxide or sulphide.

While this method is applicable irrespective of whether the so-called direct, semi-direct or indirect way of recovering the ammonia contents of the gas is used, I have ascertained that a complete absorption of hydrogen sulphide, irrespective of the ammonia proportions, and a utilization of part of the sulphur contained in such hydrogen sulphide for the production of ammonium sulphate may be obtained even in such cases where one part of the gas to be purified is washed with a suspension of ferric hydroxide, while another part of this gas, or even a gas of different origin, is washed with a solution of iron or manganese thionates. I obtain this highly important result by separating at least part, or preferably all the ammonia contents from the gas prior to its treatment with the ferric hydroxide suspension, and adding at least part of the ammonia thus separated to the other washing step, viz to the washing liquor containing the metal thionates, or to the gas to be treated with such liquor.

When purifying a coke oven gas containing less ammonia than the equivalent of its contents of hydrogen sulphide, I may first separate ammonia therefrom by the so-called semi-direct method, i. e. by cooling it down below its dew point in order to condense an aqueous solution of ammonia, or by the so-called indirect method, wherein the gas, after the condensation of the gas liquor, is washed with water in order to remove the residual ammonia. The gas treated in either way is then subjected to the action of the ferric or manganese hydroxide suspension, while the ammonia obtained by distilling the gas liquor, the ammoniacal washing liquor, or both, can be introduced into the apparatus serving for washing the gas with thionate solutions either by conducting the vapors containing ammonia directly into the washing apparatus or into the gas before it enters same. It is however also possible to condense these vapors and to allow the condensed ammonia liquor thus obtained to run into the washing liquor containing iron thionate. There is no need for freeing the condensed ammonia liquor, when distilling same, from hydrogen sulphide and carbon dioxide.

It will be understood, that the extent to which the ammonia contents of the gas, which is to be washed with the ferric or manganese hydroxide suspension prior to this washing step is separated, depends on the proportion of the total amount of hydrogen sulphide and of ammonia in the two gases or gas portions to be treated, since the ammonia thus separated serves for adjusting the ammonia contents of the gas portion treated with the metal thionate solution. If the ammonia contents of this latter gas portion is comparatively low, the ammonia contents of the other gas portion should be separated as completely as possible, preferably in accordance with the so-called indirect way of separating ammonia, i. e. by first cooling down the gas below its dew point in order to obtain an ammoniacal gas liquor, and thereafter scrubbing said gas with cold water to dissolve its residual ammonia contents.

If a single gas is to be purified in accordance with my invention, I may remove the ammonia contents therefrom prior to the division of the gas into two portions, but as the ammonia contents of one of these portions is utilized even without previously separating it, I may first divide the gas into two portions and separate ammonia merely from one of these portions, which is to be washed with the ferric or manganese hydroxide suspension.

From the foregoing it will be understood that the two different absorption methods which I employ are independent from each other as far as the gases to be purified and the washing liquors or circuits are concerned, the only indispensable connection consisting in that the ammonia which is superfluous in one of the washing steps, is utilized in the other washing step for adjusting therein the proportion of ammonia and hydrogen sulphide. However, in a more preferred way of carrying out my invention I may establish a second connection between these two washing stages in order to recover the sulphur formed in both washing steps in a substantially pure state, free of ferric or manganese compounds. Such purpose may be accomplished by mixing the spent liquor of both purification systems, subdividing this mixture in any convenient proportion, for instance in the proportion of 1:2. The smaller portion is then treated with a gas containing oxygen, for instance with air, whereby the metal sulphide contained in such liquor is converted into metal hydroxide and free sulphur. The portion thus regenerated of the liquor is reused in a closed cycle. The other portion is regenerated by means of sulphur dioxide, whereby the metal sulphides are redissolved under the formation of thionates, and another qauntity of free sulphur is formed. The liquor thus obtained is first filtered in order to separate the free sulphur, which is contained therein in suspension. The filtrate which contains all the metal compounds in the form of dissolved thionates, is reintroduced into the corresponding washing device.

It will be understood that this separation of sulphur subsequently to the regeneration of the metal thionates yields not only that amount of sulphur which is formed in this regeneration proper, but also part of the sulphur quantities formed in the other regeneration stage, and in both washing stages, as all these quantities of sulphur are passed, either directly or indirectly, into that mixing device, from which the liquor portion is withdrawn, which is to be treated with sulphur dioxide.

*Example 1*

A coke oven gas which, at a temperature above its dew point, contains about 8 grs. $NH_3$, 12 grs. $H_2S$ and 1.7 grs. cyanogen compounds (calculated as hydrocyanic acid) per cubic meter is first cooled down to about 30–35° C. In this operation a part (which may be one half) of the ammonia in the gas is recovered under the form of gas liquor which is distilled in a well known manner, vapors containing ammonia escaping from the still. If the cooled gas is now divided into two portions, one portion is washed with a suspension of ferric hydroxide containing about 10–50 kgs. iron in order to remove the hydrogen sulphide and the residual ammonia contained therein. The other portion of the gas is treated with a solution of iron or manganese thionates, whereby the concentrated ammonia vapors obtained by distillation are introduced into the gas before the latter washing operation, in order to utilize the part of the ammonia contents of the first-mentioned gas portion for supplying the second gas portion with the amount of ammonia still required for a complete absorption of the hydrogen sulphide by means of the metal thionates. Of course it is also possible to condense the ammonia vapors by cooling and to conduct the concentrated ammonia liquor thus obtained into the washing liquor of that washing stage which is operated with iron thionate solutions.

If it is desired to use an indirect process, i. e. a process in which the gas is first cooled down, part of the ammonia contained therein being recovered in the form of gas liquor, while the rest is removed by washing the gas with water, both these liquors containing ammonia may be subjected to distillation to recover the ammonia, which may be utilized in the treatment of the second gas portion with metal thionates as above described.

The spent liquor from both washing stages is mixed, and this mixture, which contains iron in the form of FeS and free sulphur in suspension, and, besides, ammonium thionates in solution, is divided into two portions. One portion, preferably one third of the total, is treated with air, whereby the metal sulphides are converted into metal hydroxides and free sulphur, and reused in cycle. The other portion is treated with sulphur dioxide, whereby the metal sulphides are redissolved under the formation of thionates. The free sulphur remaining in suspension is then filtered off, whereupon this portion is also reused in cycle.

*Example 2*

A gas of the kind described with reference to Example 1 is first cooled down, whereby part of its contents of ammonia is obtained in the form of gas liquor. The residual ammonia in the gas is now removed by washing with water. The two liquors containing ammonia are now subjected to distillation and the resulting vapors are returned into the process either as such or after condensation, exactly as described with reference to Example 1.

It will be noted that the mode of operating as described offers the particular advantages mentioned above, even in the case, where two different gases are treated in the two washing stages, respectively. Where a distillation gas and some other gas, such as for instance water gas, are produced, the water gas being added to the distillation gas in order to obtain a predetermined heating value, one of these gases may be purified prior to the mixing with the metal-hydroxide suspension in order to save its ammonia contents, which is utilized thereafter in the purification of the other gas with the metal thionate solution.

The particular technical advantage of these modes of operating consists therein, that they can easily be adapted to widely differing conditions of operation and to all kinds of apparatus. The purification effect is practically independent from all variations in the composition of the gas, more especially when different kinds of gas are to be purified simultaneously. The possibility of accumulating part of the ammonia contained in the gas in the form of a concentrated ammonia solution, renders it possible, for instance for the purpose of repairs, to temporarily throw out one or the other regeneration apparatus, so that the operation of the process is thus rendered uniform in an extraordinary degree.

In the flow sheet affixed to this specification and forming part thereof my invention is illustrated by way of example. When the mixture of the spent washing liquors has become rich enough in ammonia salts, I periodically or continuously withdraw part of it for the recovery therefrom of ammonium sulphate and sulphur. To this end I may first heat this portion to form ammonium sulphate, metal sulphate and free sulphur therein, whereupon I treat it with an excess of fresh gases in order to precipitate all the dissolved metal compounds in the form of sulphides, which are filtered off together with free sulphur and reintroduced in the process.

In contradistinction to this hitherto employed method of treating the ammonium thionate solution I have found it more advantageous to insert the step of freeing the solution from dissolved metal compounds by acting thereon with fresh gas at a point of the process, before the sulphate is formed, as only by so doing the formation of ferric disulphides ($FeS_2$) can be prevented, which cannot be dissolved by treatment with sulphur dioxide.

At any rate the precipitated metal sulphides removed by filtration should be reintroduced into the process, preferably by adding them to that portion of the spent washing liquor which is to be treated with sulphur dioxide.

My invention at the same time enables me to extract from the gas also the cyanogen contained therein and to convert same into ammonium thiocyanate, from which can then be obtained ammonium sulphate and sulphur in the manner described in my copending application for Letters Patent of the United States for "Improvements in treating thiocyanates", Serial No. 298,617.

In this copending application I have shown that if ammonium thiocyanate is decomposed hydrolytically within the washing liquor, which results in the purification of coal distillation gases, such washing liquor containing either polythionates or corresponding quantities of thiosulphate and sulphur dioxide combined therewith, the two being converted into polythionates, or if such salts or sulphur dioxide or both are introduced into the liquor, or if ammonium bisulphite or ammonium sulphite are present therein, ammonium sulphate and free sulphur will result. I have further shown that these conversions of ammonium thiocyanate take place slowly at ordinary temperature and more rapidly at an elevated temperature, more especially under pressure, preferably at a temperature varying between 140–160° C.

As all the washing liquors used in the purification of the gas contain free sulphur and as the suspensions of ferric hydroxide as well as the iron thionate solutions can contain some ammonia during the washing procedure, they will also absorb from the gas all cyanogen compounds, which are converted into ammonium thiocyanate. When treating the spent washing liquors for the production of ammonium sulphate and sulphur, the ammonium thiocyanate is also converted into ammonium sulphate and free sulphur.

Thus the yield of ammonium sulphate in a gas washing process is materially increased for the first time. It is well known that the cyanogen compounds in the gas are formed thereby, that part of the ammonia present in the gas, being primarily formed from the nitrogen in the coal when acted upon by the incandescent coal and the hot products of distillation, is converted into cyanogen compounds. Thereby hitherto a material proportion of the ammonia, about 10–20 per cent and more was decomposed. The present process therefore enables me to obtain 10–20 per cent and more ammonium sulphate in excess of the quantity hitherto obtainable.

*Example 3*

A gas having the composition described with reference to Example 1 and besides containing 1.7 grs. cyanogen compounds per cubicmeter (calculated as hydrocyanic acid) is washed in accordance with one of the methods above described. The total contents of cyanogen compounds is extracted by the washing liquors which may have an ammoniacal reaction. Such washing liquors may either contain ferric hydroxide in suspension or metal thionates in solution. The solutions obtained after separating out the iron in the form of FeS, contain besides ammonium thionates also ammonium thiocyanate. If the solutions are treated as described in my copending application for patent mentioned above, the thiocyanate is converted in the same manner as the thionates in solution into ammonium sulphate and sulphur. I thus obtain an increase in the yield of ammonium sulphate formed from the ammonia in the gas, which amounts to 13.4 per cent, the nitrogen contents of the cyanogen compounds being also converted into ammonia.

*Example 4*

A gas containing 8 grs. $NH_3$, 12 grs. $H_2S$ and 1.7 grs. cyanogen compounds (calculated as HCN) per cubicmeter is treated as described with reference to one of the preceding examples and, after the washing liquor is exhausted, the ammonium salt solution is separated from the ferric sulphide formed either by filtration or by decantation, centrifuging or the like. There is obtained an ammonium salt solution containing ammonium thiosulphate and ammonium thiocyanate in the molecular proportion of 4.24:1.00, the contents of salt varying within wide limits according to the manner of proceeding and to the concentration of the ammonia liquor. It is possible to increase the concentration of the salts in the solution to about 70 per cent.

If the solution contains for instance 460 grs. ammonium thiosulphate and 55.8 grs. ammonium thiocyanate per liter, 193.4 grs. sulphur dioxide per liter are introduced into the solution and the liquor thus treated is at once heated in an autoclave to 140–150° C. or preferably to about 200–220° C. The autoclave may either consist of a chrome-nickel-steel alloy resisting the action of sulphur dioxide or it may be lined with such alloy or with some other acid proof lining.

The salts dissolved in the liquor are decomposed into ammonium sulphate, sulphur and carbon dioxide, 507 grs. ammonium sulphate, 196.6 grs. sulphur and 32.3 grs. carbon dioxide being recovered per liter of the original salt solution.

*Example 5*

The salt solution is treated exactly as described with reference to Example 4, but 257.5 grs. sulphur dioxide are introduced per liter of the original solution. If the solution is then treated as described with reference to Example 4, there are obtained 10.7 grs. sulphur per liter of the original solution in excess of the quantity obtained according to Example 4. In other words instead of 196.6 grs. there are obtained 207.3 grs. sulphur, besides which are formed 65.4 grs. free sulphuric acid.

For the purpose of recovering neutral ammonium sulphate, this acid solution can be neutralized before evaporation with ammonia liquor or the like, or else the mother liquor rich in sulphuric acid, which remains over when evaporating, can be returned from time to time into the decomposition vessel to replace part of the sulphuric acid to be added.

*Example 6*

A salt solution is treated as described with reference to Example 4, however the liquor is not heated at once, but is allowed to stand some time after the sulphur dioxide has been introduced. The thiosulphate in solution will then be gradually converted under the action of the sulphur dioxide into poly-thionates, in the first line tri- or tetrathionate. If the solution is then heated, which now mainly contains, instead of the thiosulphate and sulphur dioxide, polythionates and ammonium thiocyanate, the heating being effected as described with reference to Examples 4 or 5, exactly the same result will be obtained including the same quantities of ammonium sulphate, sulphur and carbon dioxide as in Example 4.

*Example 7*

A solution as described with reference to Example 5, into which sulphur dioxide has been introduced, is treated exactly as described with reference to Example 6, and the same products are obtained as in Example 5.

*Example 8*

To a solution as described with reference to Example 4, are added 997 grs. sulphuric acid of 20 per cent and the liquor is heated as described with reference to Example 4. There are formed 507 grs. ammonium sulphate, 163.9 grs. sulphur and 32.25 grs. carbon dioxide.

The latter example shows that a mixture of thiosulphate and ammonium thiocyanate can also be decomposed into sulphate and sulphur by adding sulphuric acid, and in consequence thereof the acid solutions of ammonium sulphate obtained according to Examples 5 and 7 can be treated further in such manner, that the mother liquors rich in sulphuric acid, which result after evaporation for the recovery of the sulphate, can be utilized for decomposing further quantities of thiosulphate—ammonium thiocyanate solutions. Therefore in this case part of the sulphur dioxide used according to examples 4 to 7 may be replaced by sulphuric acid, 3 molecules $SO_2$ being replaced by 2 molecules $H_2SO_4$.

Obviously the proportions given in the examples need not be the same throughout, but all such solutions can be treated for the recovery of sulphate and sulphur which contain, besides ammonium thiocyanate, ammonium thiosulphate, sulphur dioxide, ammonium polythionate and sulphuric acid. Sulphites and bisulphites may also be present.

In calculating the composition of such solutions the following rules apply:

1. 1 NH₄CNS is decomposed to form sulphate and sulphur by means of
   a. 2 molecules SO₂
   b. 2 molecules polythionate
   c. 2 molecules thiosulphate+3 molecules SO₂
   d. 8 molecules bisulphite
   e. 2 molecules thiosulphate+2 molecules H₂SO₄.

2. Thiosulphates, sulphites, bisulphites and polythionates are decomposed under the formation of sulphate and sulphur according to the following rules:
   a. 2 molecules thiosulphate+1 molecule polythionate
   b. 2 molecules sulphite+1 molecule polythionate
   c. 2 molecules bisulphite+1 molecule thiosulphate
   d. 2 molecules bisulphite+1 molecule sulphite Any of these stocks may be mixed with each other in any desired proportion and in all cases sulphate and sulphur will result. If more sulphite or thiosulphate is present than corresponds to these prescriptions, non-decomposed thiosulphate and, if ammonium thiocyanate is present, also non-decomposed ammonium thiocyanate will remain in solution.

On the other hand if the solution contains more bisulphite or more polythionate than indicated above, there are formed besides sulphate and sulphur more or less free sulphuric acid and, if ammonium thiocyanate is present, also carbon dioxide. In such case, as shown above, the mother liquor rich in sulphuric acid which remains over when evaporating for the recovery of sulphate, is preferably returned into the decomposition vessel.

Various changes may be made in the details disclosed in the foregoing specification without departing from the invention or sacrificing the advantages thereof.

In the claims the terms "metal hydroxide of the iron group" and "metal thionate of the iron group" are intended to mean iron and manganese exclusively.

I claim:—

1. The method of treating coal distillation gases for the recovery therefrom of useful admixtures which comprises dividing the gas to be treated into two portions separating at least part of the ammonia contained in one of said gas portions, washing the gas portion thus treated with a suspension of a metal hydroxide of the iron group and washing the other gas portion with a solution of a metal thionate of the iron group in the presence of at least part of the ammonia previously separated.

2. The method of treating coal distillation gases for the recovery therefrom of useful admixtures which comprises dividing the gas to be treated into two portions, separating at least part of the ammonia contained in one of said gas portions, washing the gas portion thus treated with a suspension of a metal hydroxide of the iron group, washing the other gas portion with a solution of a metal thionate of the iron group in the presence of at least part of the ammonia previously separated, mixing at least part of the spent liquors of both washing steps, dividing said mixture, regenerating one portion of said mixture by treating it with air, regenerating another portion of said mixture by introducing sulphur dioxide, filtering the portion regenerated with sulphur dioxide, in order to separate free sulphur therefrom, and reusing the two portions of regenerated liquor in the two corresponding washing steps, respectively, in a closed cycle.

3. The method of treating coal distillation gases for the recovery therefrom of useful admixtures which comprises dividing the gas to be treated into two portions separating at least part of the ammonia contained in one of said gas portions, washing the gas portion thus treated with a suspension of a metal hydroxide of the iron group and washing the other gas portion with a solution of an iron thionate in the presence of at least part of the ammonia previously separated.

CHRISTIAN J. HANSEN.